US 9,960,826 B2

(12) United States Patent
Xiong et al.

(10) Patent No.: US 9,960,826 B2
(45) Date of Patent: May 1, 2018

(54) METHOD AND APPARATUS FOR CONTROLLING RI REPORT

(71) Applicant: Alcatel Lucent, Boulogne Billancourt (FR)

(72) Inventors: Zhilan Xiong, Shanghai (CN); Min Zhang, Swindon Wilts (GB); Matthew Baker, Canterbury Kent (GB); Fang-Chen Cheng, Randolph, NJ (US); Yun Deng, Shanghai (CN); Hongwei Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 14/419,464

(22) PCT Filed: Jul. 10, 2013

(86) PCT No.: PCT/IB2013/001718
§ 371 (c)(1),
(2) Date: Feb. 3, 2015

(87) PCT Pub. No.: WO2014/020430
PCT Pub. Date: Feb. 6, 2014

(65) Prior Publication Data
US 2015/0215018 A1    Jul. 30, 2015

(30) Foreign Application Priority Data
Aug. 3, 2012   (CN) .......................... 2012 1 0276231

(51) Int. Cl.
*H04B 7/04*      (2017.01)
*H04W 24/10*   (2009.01)
(Continued)

(52) U.S. Cl.
CPC ......... *H04B 7/0486* (2013.01); *H04B 7/0417* (2013.01); *H04B 7/0626* (2013.01);
(Continued)

(58) Field of Classification Search
CPC .................................................... H04B 7/0486
See application file for complete search history.

(56) References Cited

U.S. PATENT DOCUMENTS 9,572,063 B2 *   2/2017   Etemad ................. H04W 24/02
2010/0091678 A1    4/2010   Chen et al.
(Continued)

FOREIGN PATENT DOCUMENTS

CN          102013954 A1     11/2011
EP          2 437 408 A1     4/2012
(Continued)

OTHER PUBLICATIONS

Panasonic, "eNB configurations for multiple CSI reporting", 3GPP TSG RAN WG1 Meeting #68bis, Jeju, Korea, Mar. 26-30, 2012.
(Continued)

*Primary Examiner* — Hassan Kizou
*Assistant Examiner* — Deepa Belur
(74) *Attorney, Agent, or Firm* — Fay Sharpe, LLP

(57)  ABSTRACT

The present invention relates to a method and an apparatus for controlling a rank information (RI) report. According to an embodiment of the present invention, a method for controlling an RI report of a User Equipment (UE) in a base station of a Long Term Evolution (LTE) mobile communications network is provided. The method includes the following steps: determining a Channel State Information (CSI) report set for a UE, where the CSI report set includes multiple CSI feedback modes (CSI processes); sending to the UE Radio Resource Control (RRC) signaling indicating the CSI report set; and sending to the UE signaling indicat- (Continued)

ing a precoding codebook subset and/or rank restriction of each CSI feedback mode in the CSI report set. According to the above embodiment, rank selection and high rank transmission are supported for coordinated multi-point (CoMP) transmission in the LTE mobile communications network.

16 Claims, 2 Drawing Sheets

(51) Int. Cl.
*H04B 7/0417* (2017.01)
*H04B 7/06* (2006.01)
*H04W 72/06* (2009.01)
*H04L 1/06* (2006.01)
*H04L 1/00* (2006.01)

(52) U.S. Cl.
CPC ............ *H04W 24/10* (2013.01); *H04W 72/06* (2013.01); *H04L 1/0026* (2013.01); *H04L 1/06* (2013.01)

(56) References Cited

U.S. PATENT DOCUMENTS

| | | | |
|---|---|---|---|
| 2011/0103324 A1* | 5/2011 | Nam | H04L 5/0048 370/329 |
| 2012/0076017 A1* | 3/2012 | Luo | H04L 1/0027 370/252 |
| 2012/0082248 A1* | 4/2012 | Han | H04B 7/0413 375/259 |
| 2012/0120903 A1* | 5/2012 | Kim | H04B 7/024 370/329 |
| 2012/0163236 A1* | 6/2012 | Kim | H04L 25/03942 370/254 |
| 2013/0114430 A1* | 5/2013 | Koivisto | H04B 7/024 370/252 |
| 2013/0121312 A1* | 5/2013 | Roman | H04B 7/0486 370/335 |
| 2013/0272250 A1 | 10/2013 | Shimezawa | |
| 2017/0272220 A1* | 9/2017 | Chen | H04B 7/0413 |

FOREIGN PATENT DOCUMENTS

| | | |
|---|---|---|
| JP | 2012138753 | 7/2012 |
| JP | 2013516921 | 5/2013 |
| JP | 2013522982 | 6/2013 |
| JP | 2013526110 | 6/2013 |
| RU | 2408990 | 1/2011 |
| WO | 2011085230 | 7/2011 |
| WO | 2011/140974 A1 | 11/2011 |
| WO | 2012011658 | 1/2012 |
| WO | 2012022100 | 2/2012 |

OTHER PUBLICATIONS

Samsung: "CoMP RRC Parameters", 3GPP Draft; R1-122243 Comp RRC, $3^{rd}$ Generation Partnership Project (3GPP), Mobile Competence Centre; vol. RAN WG1, no. Prague, Czech Republic; 20120521-20120525, pp. 6 pages, XP050600507, May 12, 2012.
Intel Corporation: "Discussion on Rank Indicator (RI) Report for CoMP", 3GPP Draft; R1-122631 Discussion on Rank Indicator Reports (RI) for CoMP, $3^{rd}$ Generation Partnership Project (3GPP), Mobile Competence Centre; vol. RAN-WG1, no. Prague, Czech; 20120521-20120525, pp. 4 pages, XP050600816, May 12, 2012.
Ericsson et al.: "RI and PMI Sharing Between Multiple CSI Processes", 3GPP Draft; R1-122836, $3^{rd}$ Generation Partnership Project (3GPP), Mobile Competence Centre; vol. RAN-WG1, no. Prague, Czech Republic; 20120521-20120530, pp. 6 pages, XP050601012, May 12, 2012.
"$3^{rd}$ Generation Partnership Project; Technical Specification Group Radio Access Network; Evolved Universal Terrestrial Radio Access (E-UTRA); Physical Layer Procedures (Release 10)", 3GPP Standard; 3GPP TS 36.213, $3^{rd}$ Generation Partnership Project (3GPP), Mobile Competence Centre; vol. RAN-WG1, no. V10.6.0, pp. 1-125, XP050580749, Jun. 26, 2012.
ZTE, "CSI feedback modes for CoMP", R1-122135, 3GPP TSG RAN WG1 Meeting #69, May 2012.
Huawei et al., "CSI feedback modes for CoMP", R1-121946, 3GPP TSG RAN WG1 Meeting #69, May 2012.

* cited by examiner

METHOD AND APPARATUS FOR CONTROLLING RI REPORT

BACKGROUND OF THE INVENTION

Field of the Invention

The present invention generally relates to mobile communications technologies, and more particularly, to Rank Information (RI) feedback.

Description of the Prior Art

In a modern mobile communications system such as Long Term Evolution (LTE), a base station determines a transmission format, a transmission block size, a modulation and coding scheme, and a Multiple Input Multiple Output (MIMO) transmission mode to be used in a downlink (DL) and an uplink (UL). To perform such determination for the DL, the base station needs information about the performance of a current DL channel from a User Equipment (UE), and said information is generally referred to as Channel State Information (CSI).

Frequency Division Duplexing (FDD) DL coordinated multi-point (CoMP) transmission has potential in improving the coverage area, cell edge throughput, and/or spectral efficiency. In the CoMP transmission, multiple CSI reference signal resources (CSI-RS-resources) coordinate with each other to transmit data of one or more UEs. Because of the high space division multiplexing gain and/or better channel quality of high rank transmission, certain UEs may prefer high rank transmission to single rank transmission, especially in dynamic point selection (DPS) or dynamic point blanking (DPB). Therefore, the high rank transmission needs to be supported in the CoMP; however, a conventional RI report is no longer applicable.

SUMMARY OF THE INVENTION

One objective of an embodiment of the present invention is to provide an RI report mode capable of supporting network configuration of the high rank transmission.

According to an embodiment of the present invention, a method for controlling an RI report of a UE in a base station of an LTE mobile communications network is provided. The method includes the following steps: determining a CSI report set for a UE, where the CSI report set includes multiple CSI feedback modes (CSI processes); sending to the UE Radio Resource Control (RRC) signaling indicating the CSI report set; and sending to the UE signaling indicating a precoding codebook subset and/or rank restriction of each CSI feedback mode in the CSI report set.

According to another embodiment of the present invention, a method for CSI feedback in a UE of an LTE mobile communications network is provided. The method includes the following steps: receiving signaling indicating a CSI report set, where the CSI report set includes multiple CSI feedback modes; receiving signaling indicating a precoding codebook subset and/or rank restriction of each CSI feedback mode in the CSI report set; and determining a rank characteristic of the CSI feedback according to the precoding codebook subset and/or rank restriction of each CSI feedback mode in the CSI report set.

According to another embodiment of the present invention, a base station in an LTE mobile communications network is provided. The base station includes a processing unit and a transmitter. The processing unit is configured to determine a CSI report set for a UE, where the CSI report set includes multiple CSI feedback modes. The transmitter is configured to send to the UE RRC signaling indicating the CSI report set. The transmitter is further configured to send to the UE signaling indicating a precoding codebook subset and/or rank restriction of each CSI feedback mode in the CSI report set.

According to another embodiment of the present invention, a UE used in an LTE mobile communications network is provided. The UE includes a receiver and a processing unit. The receiver is configured to receive signaling indicating a CSI report set, where the CSI report set includes multiple CSI feedback modes. The receiver is further configured to receive signaling indicating a precoding codebook subset and/or rank restriction of each CSI feedback mode in the CSI report set. The processing unit is configured to determine a rank characteristic of CSI feedback according to the precoding codebook subset and/or rank restriction of each CSI feedback mode in the CSI report set.

According to the above embodiments, rank selection and high rank transmission are supported for CoMP transmission in the LTE mobile communications network.

The technical features and advantages of the present invention are summarized above, so as to make the following detailed description of the present invention easier to understand. Other features and advantages of the present invention will be described in the following, which form the subject of the claims of the present invention. It should be understood by persons skilled in the art that the disclosed concepts and embodiments may be easily used as a basis for modifying or designing other structures or procedures used for implementing the same objective as the present invention. It should be further understood by persons skilled in the art that the equivalent construction does not depart from the spirit and scope of the appended claims.

BRIEF DESCRIPTION OF THE DRAWINGS

With reference to the accompanying drawings, the following detailed description about the exemplary embodiments of the present invention are easier to understand. The present invention is illustrated through the examples and is not limited to the accompanying drawings. Similar drawing markers in the accompanying drawings indicate similar components.

DETAILED DESCRIPTION

The detailed descriptions of the accompanying drawings are intended to illustrate the current exemplary embodiments of the present invention, rather than to represent the only implementation form of the present invention. It should be understood that the same or equivalent function may be completed by different embodiments that are intended to be included within the spirit and scope of the present invention.

It should be understood by persons skilled in the art that the means and functions described herein may be implemented by using software functions combining a program control microprocessor and a general-purpose computer, and/or implemented by using an application-specific integrated circuit (ASIC). It should also be understood that, although the present invention is mainly illustrated in the form of methods and apparatuses, the present invention may also be embodied by a computer program product and a system including a computer processor and a memory connected to the processor, where the memory is encoded by using one or more programs that may complete the functions disclosed herein.

It should be understood by persons skilled in the art that different protocol standards have different technical terms to represent a base station. For example, a base station in an LTE system or an LTE-Advanced (LTE-A) system is referred to as Node B or evolved Node B (eNB). The base station in the present invention may be but is not limited to an eNB in an LTE-A system.

Generally, a CSI report is sent by a UE to a serving eNB thereof, and the serving eNB needs to indicate configuration of the CSI report. In CoMP transmission, multiple CSI-RS-resources coordinate with each other to transmit data of one or more UEs. Certain UEs may prefer high rank transmission to single rank transmission, especially in DPS or DPB.

Figure 1:
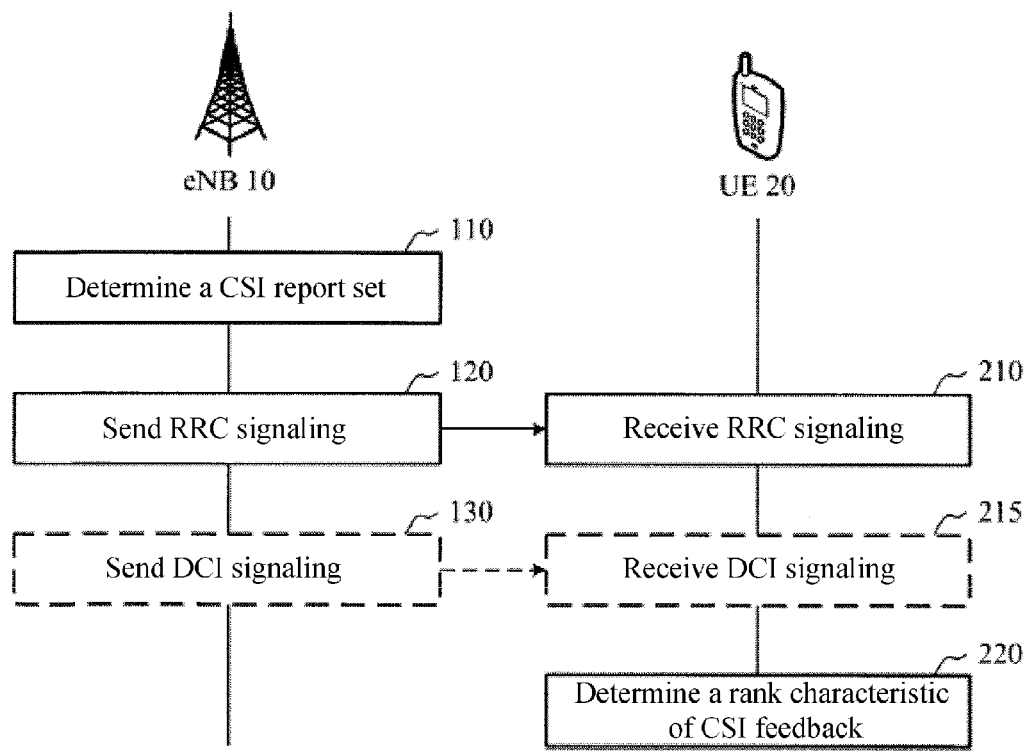
FIG. 1 is a flow chart of a method running between an eNB 10 and a UE 20 in an LTE mobile communications network according to an embodiment of the present invention.

FIG. 1 is a flow chart of a method for a CSI report supporting high rank transmission and between an eNB 10 and a UE 20 in an LTE mobile communications network according to an embodiment of the present invention. As shown in FIG. 1, the method includes steps 110 and 120 at the side of the eNB 10 and steps 210 and 220 at the side of the UE 20.

In step 110, the eNB 10 determines a CSI report set for the UE 20, where the CSI report set includes multiple CSI feedback modes (CSI processes). It should be noted that, each CSI feedback mode is defined as including a Non-zero Power (NZP) reference signal resource part used for channel measurement and an Interference Measurement Resource (IMR) part used for interference measurement.

In step 120, the eNB 10 sends to the UE 20 RRC signaling indicating the CSI report set.

In some embodiments, the method at the side of the eNB 10 further includes a step of sending additional Downlink Control Indicator (DCI) signaling to the UE 20. The RRC signaling and/or additional DCI signaling sent in step 120 further indicate a precoding codebook subset and/or rank restriction of each CSI feedback mode in the CSI report set.

In step 210, the UE 20 receives signaling indicating a CSI report set, where the CSI report set includes multiple CSI feedback modes.

In certain embodiments, the method at the side of the eNB 20 further includes a step of receiving additional DCI signaling from the eNB 10. As mentioned above, the RRC signaling and/or additional DCI signaling received in step 210 further indicate a precoding codebook subset and/or rank restriction of each CSI feedback mode in the CSI report set.

In step 220, the UE 20 determines a rank characteristic of CSI feedback according to the precoding codebook subset and/or rank restriction of each CSI feedback mode in the CSI report set.

In an embodiment, the RRC signaling sent in step 120 further indicates the precoding codebook subset restriction of each CSI feedback mode in the CSI report set through a bit map parameter, for example, parameter codebookSubsetRestriction. Preferably, such bit map parameter may be configured for each CSI feedback mode. A precoding codebook has multiple elements (or subsets) corresponding to different ranks, so an available element (subset) corresponding to a rank greater than 1 means support for high rank transmission. Two exemplary configurations of a CSI report set with a precoding codebook subset restriction are shown in Table 1-1 and Table 1-2.

TABLE 1-1

Exemplary configuration of CSI report set with precoding codebook subset restriction

| CSI process | Channel part | Interference part | Precoding codebook subset restriction |
|---|---|---|---|
| 1 | NZP CSI-RS #1 | IMR #1 | codebookSubsetRestriction #1 |
| 2 | NZP CSI-RS #2 | IMR #2 | codebookSubsetRestriction #2 |
| 3 | NZP CSI-RS #3 | IMR #3 | codebookSubsetRestriction #3 |

TABLE 1-2

Exemplary configuration of CSI report set with precoding codebook subset restriction

| CSI process | Channel part | Interference part | Precoding codebook subset restriction |
|---|---|---|---|
| 1 | NZP CSI-RS #1 | IMR #1 | codebookSubsetRestriction #1 |
| 2 | NZP CSI-RS #1 | IMR #2 | codebookSubsetRestriction #2 |

In another embodiment, the RRC signaling sent in step 120 further indicates a validity period of each CSI feedback mode in the CSI report set. The validity period is represented by, for example, a numeral indicating the number of continuous subframes. An exemplary configuration of the CSI report set with validity period information and a precoding codebook subset restriction is shown in Table 2.

TABLE 2

Exemplary configuration of CSI report set with validity period information and precoding codebook subset restriction

| CSI process | Channel part | Interference part | Precoding codebook subset restriction |
|---|---|---|---|
| 1 | NZP CSI-RS #1 | IMR #1 | codebookSubsetRestriction #1 and validity period #1 |
| 2 | NZP CSI-RS #2 | IMR #2 | codebookSubsetRestriction #2 and validity period #2 |
| 3 | NZP CSI-RS #3 | IMR #3 | codebookSubsetRestriction #3 and validity perrod #3 |

In an embodiment, the RRC signaling sent in step 120 further indicates the rank restriction of each CSI feedback mode in the CSI report set. The rank restriction may separately indicate no restriction or restriction to a specific rank for each CSI feedback mode. As for the specific rank, for example, when the rank is 1, the rank may be marked as "eNB preferential rank". An exemplary configuration of the rank restriction of each CSI feedback mode is shown in Table 3.

TABLE 3

Exemplary configuration of rank restriction of CSI report set

| CSI process | Channel part | Interference part | Rank restriction |
|---|---|---|---|
| 1 | NZP CSI-RS #1 | IMR #1 | 'No restriction' |
| 2 | NZP CSI-RS #2 | IMR #2 | 'eNB preferential rank' |
| 3 | NZP CSI-RS #3 | IMR #3 | 'eNB preferential rank' |

In an embodiment, the additional DCI signaling sent by the eNB 10 to the UE 20 indicates the rank restriction of each CSI feedback mode in the CSI report set. A configuration of the CSI report set indicated by RRC signaling and a configuration of the rank restriction corresponding to each CSI feedback mode in the CSI report set indicated by the DCI signaling are shown in Table 4-1 and Table 4-2. In some cases, the DCI signaling may be used to update the rank restriction of each CSI feedback mode in the CSI report set.

TABLE 4-1

Exemplary configuration of CSI report set indicated by RRC signaling

| CSI process | Channel part | Interference part |
|---|---|---|
| 1 | NZP CSI-RS #1 | IMR #1 |
| 2 | NZP CSI-RS #2 | IMR #2 |
| 3 | NZP CSI-RS #3 | IMR #3 |

TABLE 4-2

Exemplary configuration of rank restriction of CSI feedback mode indicated by DCI signaling

| CSI process | Rank restriction |
|---|---|
| 1 | 'No restriction' |
| 2 | 'eNB preferential rank' |
| 3 | 'eNB preferential rank' |

In an embodiment, the RRC signaling sent in step 120 further indicates the same rank restriction for all CSI feedback modes in the CSI report set. Such a rank restriction may indicate no restriction or indicate a common rank for the CSI report set, where the common rank is, for example, 1. An exemplary configuration of the rank restriction of the CSI report set is shown in Table 5-1.

TABLE 5-1

Exemplary configuration of rank restriction of CSI report set

| CSI process | Channel part | Interference part | Rank restriction |
|---|---|---|---|
| 1 | NZP CSI-RS #1 | IMR #1 | 'No restriction' or 'common rank' |
| 2 | NZP CSI-RS #2 | IMR #2 | |
| 3 | NZP CSI-RS #3 | IMR #3 | |

In another embodiment, the additional DCI signaling sent by the eNB 10 to the UE 20 indicates the same rank restriction for all CSI feedback modes in the CSI report set. The rank restriction may indicate no restriction or indicate a common rank for the CSI report set, where the common rank is, for example, 1. A configuration of the CSI report set indicated by the RRC signaling and a configuration of the rank restriction of the CSI report set indicated by the DCI signaling are shown in Table 5-2 and Table 5-3.

TABLE 5-2

Exemplary configuration of CSI report set indicated by RRC signaling

| CSI process | Channel part | Interference part |
|---|---|---|
| 1 | NZP CSI-RS #1 | IMR #1 |
| 2 | NZP CSI-RS #2 | IMR #2 |
| 3 | NZP CSI-RS #3 | IMR #3 |

TABLE 5-3

Exemplary configuration of rank restriction of CSI report set indicated by DCI signaling

| CSI process | Rank restriction |
|---|---|
| 1 | 'No restriction' or 'common rank' |
| 2 | |
| 3 | |

As mentioned above, in step 220, the UE 20 determines the rank characteristic of the CSI feedback according to the precoding codebook subset and/or rank restriction of each CSI feedback mode in the CSI report set indicated by the RRC signaling received in step 210. The precoding codebook subset and/or rank restriction of each CSI feedback mode may be different, so the rank characteristic determined by the UE 20 may change accordingly.

In an embodiment, the precoding codebook subset and/or rank restriction indicates that a CSI feedback mode has no precoding codebook subset or rank restriction, and the UE 20 selects a UE preferential rank for the CSI feedback mode.

In another embodiment, the precoding codebook subset and/or rank restriction indicates that a CSI feedback mode is restricted to a specific rank (for example, the rank marked as 'eNB preferential rank') but has no precoding codebook subset restriction, and the UE 20 selects the specific rank for the CSI feedback mode.

In another embodiment, the precoding codebook subset and/or rank restriction indicates that a CSI feedback mode has a precoding codebook subset restriction but has no rank restriction, and the UE 20 selects a UE preferential rank for the CSI feedback mode among ranks corresponding to an available precoding codebook subset.

In another embodiment, the precoding codebook subset and/or rank restriction indicates that a CSI feedback mode has a precoding codebook subset restriction and is restricted to a specific rank, and the UE 20 selects a rank of the CSI feedback for the CSI feedback mode according to a relationship between the specific rank and an available precoding codebook subset indicated by the restriction. If the available precoding codebook subset includes the specific rank, the UE 20 selects the specific rank for the CSI feedback mode. If the specific rank is less than a minimum rank in the available precoding codebook subset, the UE 20 selects the minimum rank for the CSI feedback mode. If the specific rank is greater than a maximum rank in the available precoding codebook subset, the UE 20 selects the maximum rank for the CSI feedback mode. If the available precoding codebook subset does not include the specific rank and the specific rank is between the minimum rank and the maximum rank in the available precoding codebook subset, the UE 20 selects for the CSI feedback mode the UE preferential rank or a rank, in the available precoding codebook subset, less than and closest to the specific rank.

In all the above embodiments, the DCI signaling may use an undefined item of a CSI request field.

Figure 2:
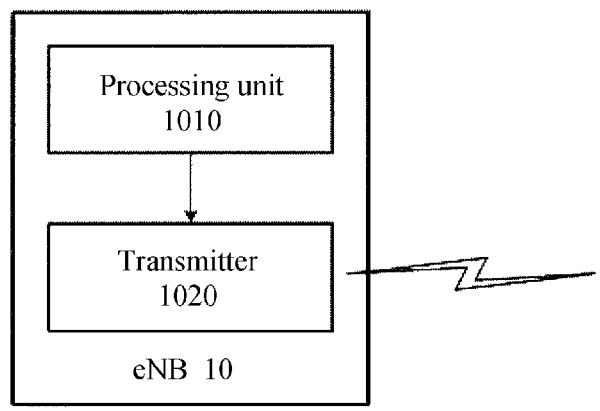
FIG. 2 is a structural block diagram of an eNB in an LTE mobile communications network according to an embodiment of the present invention.
Figure 3:
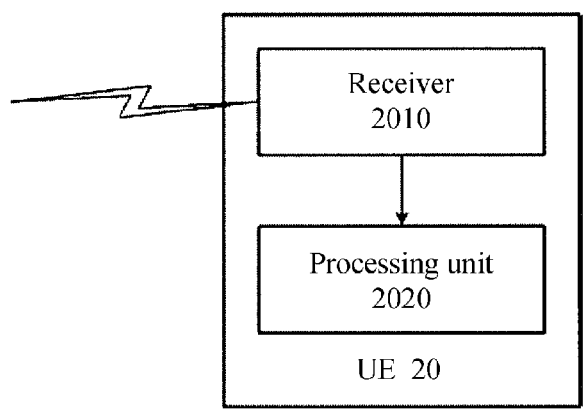
FIG. 3 is a structural block diagram of a UE in an LTE mobile communications network according to an embodiment of the present invention.

FIG. 2 is a structural block diagram of an eNB 10 in an LTE mobile communications network according to an embodiment of the present invention. FIG. 3 is a schematic block diagram of a UE 20 in an LTE mobile communications network according to an embodiment of the present invention. As shown in FIG. 2 and FIG. 3, the eNB 10 includes a processing unit 1010 and a transmitter (or transceiver) 1020, and the UE 20 includes a receiver (or transceiver) 2010 and a processing unit 2020.

According to some embodiments of the present invention, the eNB 10 and the UE 20 support high rank transmission used in CoMP.

The processing unit 1010 is configured to determine a CSI report set for the UE 20, where the CSI report set includes multiple CSI feedback modes (CSI processes). It should be noted that, each CSI feedback mode is defined as including an NZP reference signal resource part used for channel measurement and an IMR part used for interference measurement.

The transmitter 1020 is configured to send to the UE 20 RRC signaling indicating the CSI report set.

In some embodiments, the transmitter 1020 may be further configured to send additional DCI signaling to the UE 20. The RRC signaling and/or additional DCI signaling sent to the UE 20 further indicates a precoding codebook subset and/or rank restriction of each CSI feedback mode in the CSI report set.

The receiver 2010 is configured to receive signaling indicating a CSI report set, where the CSI report set includes multiple CSI feedback modes.

In some embodiments, the receiver 2010 may be further configured to receive additional DCI signaling from the eNB 10. As mentioned above, the RRC signaling and/or additional DCI signaling received from the eNB 10 further indicates the precoding codebook subset and/or rank restriction of each CSI feedback mode in the CSI report set.

The processing unit 2020 is configured to determine a rank characteristic of CSI feedback according to the precoding codebook subset and/or rank restriction of each CSI feedback mode in the CSI report set.

In an embodiment, the RRC signaling sent by the eNB 10 to the UE 20 further indicates a precoding codebook subset restriction of each CSI feedback mode in the CSI report set through a bit map parameter, for example, parameter codebookSubsetRestriction. Preferably, such bit map parameter may be configured for each CSI feedback mode. A precoding codebook has multiple elements (or subsets) corresponding to different ranks, so an available element (subset) corresponding to a rank greater than 1 means support for high rank transmission. Two exemplary configurations of a CSI report set with a precoding codebook subset restriction are shown in Table 1-1 and Table 1-2, as described above.

In another embodiment, the RRC signaling sent by the eNB 10 to the UE 20 further indicates a validity period of each CSI feedback mode in the CSI report set. The validity period is represented by, for example, a numeral indicating the number of continuous subframes. An exemplary configuration of the CSI report set with validity period information and a precoding codebook subset restriction is shown in Table 2, as described above.

In an embodiment, the RRC signaling sent by the eNB 10 to the UE 20 further indicates the rank restriction of each CSI feedback mode in the CSI report set. The rank restriction may separately indicate no restriction or restriction to a specific rank for each CSI feedback mode. As for the specific rank, for example, when the rank is 1, the rank may be marked as "eNB preferential rank". An exemplary configuration of the rank restriction of each CSI feedback mode is shown in Table 3, as described above.

In an embodiment, the additional DCI signaling sent by the eNB 10 to the UE 20 indicates the rank restriction of each CSI feedback mode in the CSI report set. A configuration of the CSI report set indicated by RRC signaling and a configuration of the rank restriction corresponding to each CSI feedback mode in the CSI report set indicated by the DCI signaling are shown in Table 4-1 and Table 4-2, as described above. In some cases, the DCI signaling may be used to update the rank restriction of each CSI feedback mode in the CSI report set.

In another embodiment, the RRC signaling sent by the eNB 10 to the UE 20 further indicates the same rank restriction for all CSI feedback modes in the CSI report set. Such a rank restriction may indicate no restriction or indicate a common rank for the CSI report set, where the common rank is, for example, 1. An exemplary configuration of the rank restriction of the CSI report set is shown in Table 5-1, as described above.

In another embodiment, the additional DCI signaling sent by the eNB 10 to the UE 20 indicates the same rank restriction for all CSI feedback modes in the CSI report set. The rank restriction may indicate no restriction or indicate a common rank for the CSI report set, where the common rank is, for example, 1. A configuration of the CSI report set indicated by the RRC signaling and a configuration of the rank restriction of the CSI report set indicated by the DCI signaling are shown in Table 5-2 and Table 5-3, as described above.

As mentioned above, the processing unit 2020 is configured to determine the rank characteristic of the CSI feedback according to the precoding codebook subset and/or rank restriction of each CSI feedback mode in the CSI report set indicated by the received RRC signaling. The precoding codebook subset and/or rank restriction of each CSI feedback mode may be different, so the determined rank characteristic may change accordingly.

In an embodiment, the precoding codebook subset and/or rank restriction indicates that the CSI feedback mode has no precoding codebook subset or rank restriction, and the processing unit 2020 selects a UE preferential rank for the CSI feedback mode.

In another embodiment, the precoding codebook subset and/or rank restriction indicates that a CSI feedback mode is restricted to a specific rank (for example, the rank marked as 'eNB preferential rank') but has no precoding codebook subset restriction, and the processing unit 2020 selects the specific rank for the CSI feedback mode.

In another embodiment, the precoding codebook subset and/or rank restriction indicates that a CSI feedback mode has a precoding codebook subset restriction but has no rank restriction, and the processing unit 2020 selects a UE preferential rank for the CSI feedback mode among ranks corresponding to an available precoding codebook subset.

In another embodiment, the precoding codebook subset and/or rank restriction indicates that a CSI feedback mode has a precoding codebook subset restriction and is restricted to a specific rank, and the processing unit 2020 selects a rank of the CSI feedback for the CSI feedback mode according to a relationship between the specific rank and an available precoding codebook subset indicated by the restriction. If the available precoding codebook subset includes the specific rank, the processing unit 2020 selects the specific rank for the CSI feedback mode. If the specific rank is less than a minimum rank in the available precoding codebook subset, the processing unit 2020 selects the minimum rank for the CSI feedback mode. If the specific rank is greater than a maximum rank in the available precoding codebook subset, the processing unit 2020 selects the maximum rank for the CSI feedback mode. If the available precoding codebook subset does not include the specific rank and the specific rank is between the minimum rank and the maximum rank in the available precoding codebook subset, the processing unit 2020 selects for the CSI feedback mode the UE preferential rank or a rank, in the available precoding codebook subset, less than and closest to the specific rank.

In all the above embodiments, the DCI signaling may use an undefined item of a CSI request field.

Different embodiments of the present invention being illustrated and described above, the present invention is not limited to these embodiments. Many modifications, alterations, variations, replacements and equivalences are obvious to persons skilled in the art without departing from the spirit and scope of the present invention described in the claims.

We claim:

1. A method in a base station in a communication network, the method comprising:
   determining a CSI report set comprising a plurality of CSI processes for a UE, wherein the CSI report set comprises multiple CSI feedback modes;
   sending signaling indicative of the CSI report set to the UE; and
   sending signaling indicative of:
      (i) a restriction of a precoding codebook subset for each CSI process in the CSI report set; or
      (ii) a rank for each CSI process in the CSI report set.

2. A method, in a UE in an LTE cellular communication network, the method comprising:
   receiving RRC signaling indicative of a CSI report set, wherein RRC signaling and/or additional DCI signaling is further indicative of:
      (i) a restriction of a precoding codebook subset for each CSI process in the CSI report set; or
      (ii) a rank for each CSI process in the CSI report set; and
   determining a rank characteristic of CSI feedback in accordance with:
      (i) the restriction of precoding codebook subset for each CSI process in the CSI report set; or
      (ii) the rank for each CSI process in the CSI report set.

3. A base station in an LTE cellular communication network, the base station comprising:
   a processor configured to determine a report set comprising a plurality of CSI processes for a UE, wherein each CSI process is defined with one part of NZP RS resource for channel measurement and one part of IMR for interference measurement; and
   a transmitter configured to send RRC signaling indicative of the CSI report set to the UE,
   wherein the RRC signaling and/or additional DCI signaling is further indicative of restriction of:
      (i) a precoding codebook subset for each CSI process in the CSI report set; or
      (ii) a rank for each CSI process in the CSI report set.

4. The base station according to claim 3, wherein the RRC signaling is further indicative of restriction of precoding codebook subset for each CSI process in the CSI report set by means of the parameter codebook Subset Restriction.

5. The base station according to claim 4, wherein the RRC signaling is further indicative of valid duration for each CSI process in the CSI report set.

6. The base station according to claim 3, wherein the RRC signaling is further indicative of restriction of rank for each CSI process in the CSI report set.

7. The base station according to claim 3, wherein the transmitter is further configured to send the additional DCI signaling indicative of restriction of rank for each CSI process in the CSI report set to the UE.

8. The base station according to claim 7, wherein the DCI signaling is used for updating the restriction of rank for each CSI process in the CSI report set.

9. The method according to claim 7, wherein the DCI signaling comprises a 2-bit CSI request field.

10. A UE in an LTE communication network, the UE comprising:
    a receiver configured to receive RRC signaling indicative of a CSI report set, wherein the RRC signaling and/or additional DCI signaling is further indicative of:
       (i) a restriction of a precoding codebook subset for each CSI process in the CSI report set; or
       (ii) a rank for each CSI process in the CSI report set; and
    a processor configured to determine the rank characteristics of CSI feedback in accordance with:
       (i) the restriction of precoding codebook subset for each CSI process in the CSI report set; or
       (ii) the rank for each CSI process in the CSI report set.

11. The UE according to claim 10, wherein the processor is configured to: to,
    if the restriction of precoding codebook subset and/or rank indicates no restriction of precoding codebook subset and rank for a CSI process, select UE preferential rank for CSI feedback of the CSI process.

12. The UE according to claim 10, wherein the processor is configured to:
    if the restriction of precoding codebook subset and/or rank indicates a specific rank without restriction of precoding codebook subset for a CSI process, select the specific rank for CSI feedback of the CSI process.

13. The UE according to claim 10, wherein the processor is configured to:
    if the restriction of precoding codebook subset and/or rank indicates restriction of precoding codebook subset without restriction of rank for a CSI process, select UE-preferred rank within available precoding codebook subset for CSI feedback of the CSI process.

14. The UE according to claim 10, wherein the processor is configured to, if the restriction of precoding codebook subset and/or rank indicates a specific rank and restriction of precoding codebook subset for a CSI process, select the following rank for CSI feedback of the CSI process:
    the specific rank in case that available precoding subset contains the specific rank;
    the lowest rank in available precoding codebook subset in case that the specific rank is less than the lowest rank;
    the highest rank in available precoding codebook subset in case that the specific rank is greater than the highest rank; and
    a UE-preferred rank or a smaller rank closest to the specific rank within available precoding codebook subset in case that available precoding codebook subset does not contain the specific rank and the specific rank is between the lowest and highest ranks in available precoding codebook subset.

15. The method of claim 1, wherein the method includes sending the signaling indicative of the restriction of a precoding codebook subset for each CSI process in the CSI report set.

16. The method of claim 1, wherein the method includes sending the signaling indicative of the rank for each CSI process in the CSI report set.

* * * * *